Patented Oct. 14, 1947

2,428,805

UNITED STATES PATENT OFFICE 2,428,805

DIOXOLANES AND METHODS OF PREPARING THEM

Morris S. Kharasch, Chicago, Ill., assignor to Eli Lilly and Company, Indianapolis, Ind., a corporation of Indiana No Drawing. Application October 25, 1943, Serial No. 507,614

4 Claims. (Cl. 260—338)

This invention relates to dioxolanes and methods of producing them.

The compositions of this invention are useful as solvents, intermediates for resins, and disinfectants.

The compositions of this invention may be represented by the following formula:

(1) 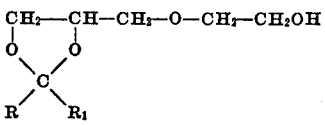

in which R is hydrogen or an alkyl group, preferably having less than 6 carbon atoms such as the methyl, ethyl, propyl, isopropyl, or butyl group, and $R_1$ is hydrogen or an alkyl group, preferably having less than 6 carbon atoms such as the methyl, ethyl, propyl, isopropyl, or butyl group.

The compositions of this invention are produced by reacting in the presence of a dehydrating agent, such as concentrated sulfuric acid, 3-(β-hydroxyethoxy)-1,2-propanediol with an aliphantic aldehyde or ketone represented by the following formula:

(2) 

A small quantity of a dehydrating agent, such as concentrated sulfuric acid or phosphorus pentoxide, is added to the 3-(β-hydroxyethoxy)-1,2-propanediol. The aldehyde or ketone represented by formula 2 is slowly added to this mixture and the mixture during the addition is maintained slightly below 100° C. After the addition is complete, the reaction mixture is heated slightly below 100° C. for a period of about 1 to 5 hours. During this time the desired dioxolane is formed. The reaction which takes place may be represented as follows:

(3) 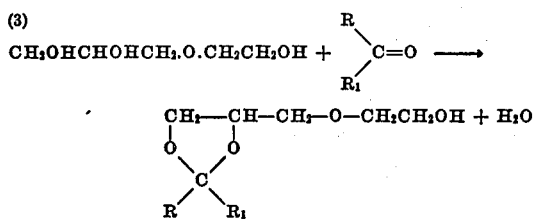

The reaction mixture is extracted with a suitable low-boiling solvent, such as ether. The solvent extract which contains the desired dioxolane is first dried with a dehydrating agent, such as anhydrous potassium carbonate, and the solvent is removed by distillation. The dioxolane is isolated from the residue by distillation.

Typical examples of the preparation of the compositions of this invention are as follows:

*Example 1.*—Preparation of 2-methyl-4-(β-hydroxyethoxymethyl)-1,3-dioxolane.

The 3-(β-hydroxyethoxy)-1,2-propanediol employed in the production of 2-methyl-4-(β-hydroxyethoxymethyl)-1,3-dioxolane is a new compound and is prepared as follows:

To 278 g. (3 moles) of epichlorohydrin is added 379 g. (6 moles) of ethylene glycol. Since the two liquids are immiscible, the mixture is vigorously agitated and concentrated sulfuric acid is added a few drops at a time. The mixture becomes homogeneous after the addition of 1 cc. of sulfuric acid. Since further additions of acid cause a considerable rise in temperature, the flask is cooled with running water during the subsequent addition. A total of 13 cc. of sulfuric acid is added. The mixture is then refluxed on a steam bath for 12 hours and neutralized with excess barium carbonate (about 38 g.). The material is distilled directly at 3 mm. Two main fractions are obtained: (a) unidentified material (B. P. below 135° C.), and (b) 1-chloro-3-(β-hydroxyethoxy)-2-propanol (B. P. 135–139° C.).

To 161 g. (1.04 moles) of 1-chloro-3-(β-hydroxyethoxy)-2-propanol is added a solution of 60 g. (0.5 mole) of sodium carbonate in 1200 cc. of water. The mixture is heated on the steam bath for 16 hours. Water is removed by evaporation on a steam bath. Methyl alcohol is added to the residue, and the sodium chloride removed by filtration. The filtrate is concentrated on a steam bath, and the residue is distilled. A considerable amount of sodium chloride separates during distillation. The portion boiling at 161–191° C. at 2–5 mm. is collected. This portion is submitted to slow distillation and the fraction boiling at 145–150° C. at 1 mm. is collected and comprises the 3-(β-hydroxyethoxy)-1,2-propanediol.

To 52 g. (0.382 mole) of 3-(β-hydroxyethoxy)-1,2-propanediol is added 2 cc. of 50 percent sulfuric acid. Then 18 g. of paraldehyde is slowly added while the reaction flask is heated on a steam bath and its contents stirred. After the addition of the paraldehyde is complete, heating is continued for three hours. The reaction mixture is extracted with ether. The ether extract is dried with anhydrous potassium carbonate, and the ether removed by distillation on a water bath. The residue is distilled, and the fraction boiling at 112–114° C. (8 mm.) is collected. The yield is 27 g. (43 percent of the calculated amount). This material may be subjected to another distillation and the fraction boiling at 113–115° C. is collected, and comprises 2-methyl-4-(β-hydroxyethoxymethyl)-1,3-dioxolane.

*Example 2.*—Preparation of 4-(β-hydroxyethoxymethyl)-1,3-dioxolane.

To 52 g. (0.382 mole) of 3-(β-hydroxyethoxy)-1,2-propanediol is added 2 cc. of 50 percent sulfuric acid. This mixture is heated on a steam bath and, while the mixture is stirred, 18 g. of paraformaldehyde is added slowly. Heating is continued for a period of about 3 hours. During this time the 4-(β-hydroxyethoxymethyl)-1,3-dioxolane is formed. The reaction mixture is extracted with ether. The ether extract, which contains the 4-(β-hydroxyethoxymethyl)-1,3-dioxolane, is dried and the ether removed by distillation on a water bath. The 4-(β-hydroxyethoxymethyl)-1,3-dioxolane contained in the residue may, if desired, be distilled.

*Example 3.*—Preparation of 2,2-dimethyl-4-(β-hydroxyethoxymethyl)-1,3-dioxolane.

To produce 2,2-dimethyl-4-(β-hydroxyethoxymethyl)-1,3-dioxolane, the procedure outlined in Example 2 is followed except that, instead of employing paraformaldehyde acetone is used.

What is claimed is:

1. A 4-(β-hydroxyethoxymethyl)-1,3-dioxolane which is represented by the following formula:

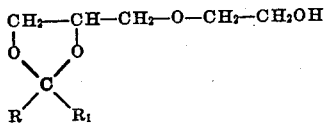

in which R is a member selected from the class consisting of hydrogen and alkyl groups having less than six carbon atoms, and $R_1$ is a member selected from the class consisting of hydrogen and alkyl groups having less than six carbon atoms.

2. The method of producing a 4-(β-hydroxyethoxymethyl)-1,3-dioxolane, which comprises reacting in the presence of a dehydrating agent 3-(β-hydroxyethoxy)-1,2-propanediol with a member selected from the class consisting of aliphatic aldehydes and aliphatic ketones.

3. The method of producing a 4-(β-hydroxyethoxymethyl)-1,3-dioxolane, which comprises adding a member selected from the class consisting of aliphatic aldehydes and aliphatic ketones to a 3-(β-hydroxyethoxy)-1,2-propanediol in the presence of sulfuric acid.

4. 2-Methyl-4-(β-hydroxyethoxymethyl)-1,3-dioxolane.

MORRIS S. KHARASCH.

REFERENCES CITED

The following references are of record in the file of this patent:

UNITED STATES PATENTS

| Number | Name | Date |
|---|---|---|
| 2,095,814 | Hopff et al. | Oct. 12, 1937 |
| 2,286,791 | Dickey et al. | June 16, 1942 |
| 2,028,403 | Mares | Jan. 21, 1936 |
| 2,268,533 | Allen | Dec. 30, 1941 |

FOREIGN PATENTS

| Number | Country | Date |
|---|---|---|
| 429,096 | Great Britain | May 16, 1935 |

OTHER REFERENCES

Kharasch & Nudenberg—Journal of Organic chemistry, vol. 8, pp. 189–193, March 1943.

Outline of Organic Chemistry, Degering, 4th edition, 1945, pages 94–98.